(12) United States Patent
Kwasny et al.

(10) Patent No.: US 12,404,421 B2
(45) Date of Patent: Sep. 2, 2025

(54) COATING SOLUTIONS AND CROSSLINKED POLYMER FILMS

(71) Applicant: DUPONT ELECTRONICS, INC., Wilmington, DE (US)

(72) Inventors: Michael Thomas Kwasny, Columbus, OH (US); Kenneth Hernandez, Stoneham, MA (US); Michael Henry Howard, Jr., Montchanin, DE (US); Joseph Casey Johnson, Pickerington, OH (US); Kostantinos Kourtakis, Media, PA (US)

(73) Assignee: DUPONT ELECTRONICS, INC., Wilmington, DE (US)

( * ) Notice: Subject to any disclaimer, the term of this patent is extended or adjusted under 35 U.S.C. 154(b) by 64 days.

(21) Appl. No.: 17/686,242

(22) Filed: Mar. 3, 2022

(65) Prior Publication Data

US 2022/0282118 A1 Sep. 8, 2022

Related U.S. Application Data

(60) Provisional application No. 63/156,113, filed on Mar. 3, 2021.

(51) Int. Cl.
*C09D 179/08* (2006.01)
*C08K 3/04* (2006.01)

(52) U.S. Cl.
CPC .............. *C09D 179/08* (2013.01); *C08K 3/04* (2013.01)

(58) Field of Classification Search
CPC .................................. C09D 179/08; C09K 3/04
See application file for complete search history.

(56) References Cited

U.S. PATENT DOCUMENTS

| | | | |
|---|---|---|---|
| 2,801,185 A | 7/1957 | Iler | |
| 4,383,105 A | 5/1983 | Irwin | |
| 4,522,958 A | 6/1985 | Das et al. | |
| 5,648,407 A | 7/1997 | Goetz et al. | |
| 8,981,353 B2 | 3/2015 | Ree et al. | |
| 2009/0123867 A1* | 5/2009 | Yuba | G03F 7/0751 556/413 |
| 2011/0177321 A1* | 7/2011 | Carney | C08G 73/105 428/323 |
| 2014/0024786 A1 | 1/2014 | Sohn et al. | |
| 2015/0086753 A1* | 3/2015 | Matsumoto | C08G 73/105 524/876 |
| 2017/0298186 A1* | 10/2017 | Takemura | C08G 73/126 |

FOREIGN PATENT DOCUMENTS

| | | |
|---|---|---|
| JP | 4031624 B2 | 1/2008 |
| JP | 4406921 B2 | 2/2010 |
| WO | 2010/111755 A2 | 10/2010 |

OTHER PUBLICATIONS

P.G.M. Wuts and T.W. Greene, Greene's Protective Groups in Organic Synthesis, 4th Ed., John Wiley & Sons, Inc. (2007) (copy not provided).
Sun et al., "Enhancement of Flux and Solvent Stability of Matrimid Thin-Film Composite Membranes for Organic Solvent Nanofiltration", AIChE Journal, vol. 60, No. 10, Oct. 2014, pp. 3623-3633.
Hendrix et al., "Optimization of solvent resistant nanofiltration membranes prepared by the in-situ diamine crosslinking method", Journal of Membrane Science, 421-422, pp. 15-24 (2012).

\* cited by examiner

*Primary Examiner* — Ling Siu Choi
*Assistant Examiner* — Andrea Wu

(57) ABSTRACT

In a first aspect, a coating solution includes a soluble polymer and a crosslinking precursor. The soluble polymer includes an imide group. The crosslinking precursor includes a first amine group that is either reactive or passivated towards crosslinking and one or more additional amine groups, wherein the one or more additional amine groups has been passivated towards crosslinking such that the crosslinking precursor can be chemically converted, thermally converted, photo-converted or dissociated to form at least two reactive amines. In a second aspect, a process for forming a polymer film includes: (a) casting a coating solution, (b) activating the crosslinking precursor using an external stimulus to form at least two reactive amines and crosslink the polymer, and (c) drying the polymer film. The coating solution includes a soluble polymer, including an imide group, and a crosslinking precursor.

11 Claims, No Drawings

COATING SOLUTIONS AND CROSSLINKED POLYMER FILMS

FIELD OF DISCLOSURE

The field of this disclosure is coating solutions, crosslinked polymer films, electronic devices, and processes for forming the same.

BACKGROUND OF THE DISCLOSURE

Polymer films, such as polyimide films, are used in a broad range of applications in the electronics industry, taking advantage of the wide variety of mechanical, electrical and optical properties they may provide, as well as beneficial thermal and chemical durability needed both during processing of various electronic components and during use of electronic devices. Polymer films can be used in the manufacture of flexible circuits and copper clad laminates, as well as in display devices, such as for cover windows, touch sensor panels and other device layers. Achieving the desired combination of these properties in a single film, however, can be challenging.

In some applications, soluble polymers having an imide group can be used to form polymer films at lower temperatures than films made using the polymer precursors. Lowering the film-forming temperature can provide a range of advantages, such as producing films with low color (e.g., low b*), using lower viscosity coating solutions to produce thinner films, allowing for lower temperature and ultrasmooth polymer films to be used as carrier substrates, using more environmentally benign solvent systems, and lowering the overall costs of making films.

However, soluble polymers having an imide group do not have the solvent resistance typically required in electronic component manufacturing to limit the degradation of the polymer film during fabrication. Therefore, there is a need to produce soluble polymer films that maintain good solvent resistance.

SUMMARY

In a first aspect, a coating solution includes a soluble polymer and a crosslinking precursor. The soluble polymer includes an imide group. The crosslinking precursor includes a first amine group that is either reactive or passivated towards crosslinking and one or more additional amine groups, wherein the one or more additional amine groups has been passivated towards crosslinking such that the crosslinking precursor can be chemically converted, thermally converted, photo-converted or dissociated to form at least two reactive amines.

In a second aspect, a process for forming a polymer film includes: (a) casting a coating solution, (b) activating the crosslinking precursor using an external stimulus to form at least two reactive amines and crosslink the polymer, and (c) drying the polymer film. The coating solution includes a soluble polymer, including an imide group, and a crosslinking precursor. The crosslinking precursor includes a first amine group that is either reactive or passivated towards crosslinking, and one or more additional amine groups, wherein the one or more additional amine groups has been passivated towards crosslinking such that the crosslinking precursor can be chemically cleaved, thermally cleaved, photo-cleaved or dissociated to form at least two reactive amines.

The foregoing general description and the following detailed description are exemplary and explanatory only and are not restrictive of the invention, as defined in the appended claims.

DETAILED DESCRIPTION

In a first aspect, a coating solution includes a soluble polymer and a crosslinking precursor. The soluble polymer includes an imide group. The crosslinking precursor includes a first amine group that is either reactive or passivated towards crosslinking and one or more additional amine groups, wherein the one or more additional amine groups has been passivated towards crosslinking such that the crosslinking precursor can be chemically converted, thermally converted, photo-converted or dissociated to form at least two reactive amines.

In one embodiment of the first aspect, the one or more additional amine groups have been passivated to form a moiety selected from the group consisting of carbamates, N-alkyl amines, N,N-dialkyl amines, N-aryl amines, N,N-diaryl amines, benzyl amines, amides, sulfonamides, ammonium salts made from acids and silyl derivatives. In a specific embodiment, a carbamate is thermally cleavable. In a more specific embodiment, a thermally cleavable carbamate is selected form the group consisting of tert-butyloxycarbonyl, fluorenylmethoxycarbonyl, and benzyl carbamate. In another specific embodiment, a carbamate is photo-cleavable and a photo-cleavable carbamate is selected from the group consisting of 3,5-dimethoxybenzyl carbamate, m-nitrophenyl carbamate, and o-nitrobenzyl carbamate. In yet another specific embodiment, an amide is selected from the group consisting of formamide, trifluoroacetamide, trichloroacetamide, chloroacetamide, phenylacetamide, 3-phenylpropanamide, 3-pyridylcarboxamide, N-benzoylphenylalanyl, and benzamide. In still another specific embodiment, an amide can be thermally cleaved, chemically cleaved, photo-cleaved, dissociated or a mixture thereof. In still yet another specific embodiment, an ammonium salt is made from an acid selected from the group consisting of acetic acid, butyric acid, pivalic acid, hydrochloric acid, and sulfuric acid, and the ammonium salt can be thermally dissociated to form a reactive amine.

In another embodiment of the first aspect, the crosslinking precursor is selected from a single multi-functional precursor, a combination of multiple single-functional precursors, or a mixture thereof.

In yet another embodiment of the first aspect, the soluble polymer is selected from the group consisting of polyimides, poly(amide-imides), poly(ether-imides), poly(ester-imides), copolymers comprising amide, ester or ether groups, and mixtures thereof.

In still another embodiment of the first aspect, the coating solution further includes a filler selected from the group consisting of nanoparticles, colorants, matting agents, submicron particles, thermally conductive fillers, electrically conductive fillers and mixtures thereof. In a specific embodiment, a colorant includes low conductivity carbon black.

In a second aspect, a process for forming a polymer film includes: (a) casting a coating solution, (b) activating the crosslinking precursor using an external stimulus to form at least two reactive amines and crosslink the polymer, and (c) drying the polymer film. The coating solution includes a soluble polymer, including an imide group, and a crosslinking precursor. The crosslinking precursor includes a first amine group that is either reactive or passivated towards crosslinking, and one or more additional amine groups, wherein the one or more additional amine groups has been passivated towards crosslinking such that the crosslinking precursor can be chemically cleaved, thermally cleaved, photo-cleaved or dissociated to form at least two reactive amines.

In one embodiment of the second aspect, the external stimulus is heat, light or a different chemical species.

Many aspects and embodiments have been described above and are merely exemplary and not limiting. After reading this specification, skilled artisans appreciate that other aspects and embodiments are possible without departing from the scope of the invention. Other features and advantages of the invention will be apparent from the following detailed description, and from the claims.

In one embodiment, a crosslinked polymer film can be made in a passivated crosslinking process using a coating solution having a soluble polymer and a crosslinking precursor, in which the soluble polymer includes an imide group. The crosslinking precursor includes a first amine group that is either reactive or passivated towards crosslinking and one or more additional amine groups which have been passivated towards crosslinking such that the crosslinking precursor can be activated by an external stimulus to form at least two reactive amines. After activation the polymer can be crosslinked. Soluble polymers having imide groups can include polyimides, poly(amide-imides), poly(ester-imides), poly(ether-imides), copolymers including imide, amide, ester and ether groups and mixtures thereof. The term "passivated towards crosslinking" as used herein is used to describe amine groups that have been functionalized to inhibit reactivity and/or make them un-reactive towards the soluble polymer having an imide group upon initial introduction but can later be activated to react and crosslink the soluble polymer. In this way, the amine groups that have been functionalized substantially slow or inhibit the polymer from crosslinking which would make the polymer insoluble before film formation. The crosslinking precursor can subsequently be activated to form at least two reactive amines, which allows crosslinking of the polymer to occur. By passivating the crosslinking reaction until after film formation, polymer films can be formed with excellent solvent resistance.

In one embodiment, a passivated crosslinking reaction includes chemical compounds that remain inert or are kinetically inhibited (i.e., are passivated) under initial film preparation and processing conditions due to the presence of a passivating group which is converted, e.g., cleaved or dissociated, to form a reactive amine upon exposure to an external stimulus. Once the passivating group is converted to form the reactive amine, these compounds are activated and participate in a chemical reaction that crosslinks the polymer chains in the film. In one embodiment the external stimulus is heat. In this case, one or more of the initially passivated amine groups is cleaved or dissociated through a thermally initiated process and becomes reactive, enabling the crosslinking agent to crosslink the film. In one embodiment the external stimulus is irradiation with a light source. In this case, one or more of the initially passivated amine groups is converted to form a reactive amine through a photoinitiated process. In one embodiment the external stimulus is a different chemical species. In this case, one or more of the initially passivated amine groups is converted to form a reactive amine through a chemically initiated process. In one embodiment the external stimulus is any combination of the above listed stimuli.

Depending upon context, "diamine" as used herein is intended to mean: (i) the unreacted form (i.e., a diamine monomer); (ii) a partially reacted form (i.e., the portion or portions of an oligomer or other polymer precursor derived from or otherwise attributable to diamine monomer) or (iii) a fully reacted form (the portion or portions of the polymer derived from or otherwise attributable to diamine monomer). The diamine can be functionalized with one or more moieties, depending upon the particular embodiment selected in the practice of the present invention.

Indeed, the term "diamine" is not intended to be limiting (or interpreted literally) as to the number of amine moieties in the diamine component. For example, (ii) and (iii) above include polymeric materials that may have two, one, or zero amine moieties. Alternatively, the diamine may be functionalized with additional amine moieties (in addition to the amine moieties at the ends of the monomer that react with dianhydride to propagate a polymeric chain). Such additional amine moieties could be used to crosslink the polymer or to provide other functionality to the polymer.

Similarly, the term "dianhydride" as used herein is intended to mean the component that reacts with (is complimentary to) the diamine and in combination is capable of reacting to form an intermediate (which can then be cured into a polymer). Depending upon context, "anhydride" as used herein can mean not only an anhydride moiety per se, but also a precursor to an anhydride moiety, such as: (i) a pair of carboxylic acid groups (which can be converted to anhydride by a de-watering or similar-type reaction); or (ii) an acid halide (e.g., chloride) ester functionality (or any other functionality presently known or developed in the future which is) capable of conversion to anhydride functionality. Acyl chloride monomers can also be used as reagents to create amide groups in poly(amide-imides), or other amide-containing copolymers, by the reaction of the acid chloride containing monomers with amine containing monomers.

Depending upon context, "dianhydride" can mean: (i) the unreacted form (i.e. a dianhydride monomer, whether the anhydride functionality is in a true anhydride form or a precursor anhydride form, as discussed in the prior above paragraph); (ii) a partially reacted form (i.e., the portion or portions of an oligomer or other partially reacted or precursor polymer composition reacted from or otherwise attributable to dianhydride monomer) or (iii) a fully reacted form (the portion or portions of the polymer derived from or otherwise attributable to dianhydride monomer).

The dianhydride can be functionalized with one or more moieties, depending upon the particular embodiment selected in the practice of the present invention. Indeed, the term "dianhydride" is not intended to be limiting (or interpreted literally) as to the number of anhydride moieties in the dianhydride component. For example, (i), (ii) and (iii) (in the paragraph above) include organic substances that may have two, one, or zero anhydride moieties, depending upon whether the anhydride is in a precursor state or a reacted state. Alternatively, the dianhydride component may be functionalized with additional anhydride type moieties (in addition to the anhydride moieties that react with diamine to provide a polymer). Such additional anhydride moieties could be used to crosslink the polymer or to provide other functionality to the polymer.

Although methods and materials similar or equivalent to those described herein can be used in the practice or testing of the present invention, suitable methods and materials are described herein.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In describing certain polymers, it should be understood that sometimes applicants are referring to the polymers by the monomers used to make them or the amounts of the monomers used to make them. While such a description may not include the specific nomenclature used to describe the final polymer or may not contain product-by-process terminology, any such reference to monomers and amounts should be interpreted to mean that the polymer is made from those monomers or that amount of the monomers, and the corresponding polymers and compositions thereof.

The materials, methods, and examples herein are illustrative only and, except as specifically stated, are not intended to be limiting.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Organic Solvents

Useful organic solvents for the synthesis of the soluble polymers of the present invention are preferably capable of dissolving the polymer precursor materials. Such a solvent should also have a relatively low boiling point, such as below 225° C., so the polymer can be dried at moderate (i.e., more convenient and less costly) temperatures. A boiling point of less than 210, 205, 200, 195, 190, or 180° C. is preferred.

Useful organic solvents include: N-methylpyrrolidone (NMP), dimethylacetamide (DMAc), methyl ethyl ketone (MEK), N,N'-dimethyl-formamide (DMF), dimethyl sulfoxide (DMSO), tetramethyl urea (TMU), glycol ethyl ether, diethyleneglycol diethyl ether, 1,2-dimethoxyethane (monoglyme), diethylene glycol dimethyl ether (diglyme), 1,2-bis-(2-methoxyethoxy) ethane (triglyme), gamma-butyrolactone, and bis-(2-methoxyethyl) ether, tetrahydrofuran (THF), ethyl acetate, hydroxyethyl acetate glycol monoacetate, acetone and mixtures thereof. In one embodiment, preferred solvents include N-methylpyrrolidone (NMP) and dimethylacetamide (DMAc).

Diamines

In one embodiment, a suitable diamine for forming the soluble polymer can include an aliphatic diamine, such as 1,2-diaminoethane, 1,6-diaminohexane (HMD), 1,4-diaminobutane, 1,5 diaminopentane, 1,7-diaminoheptane, 1,8-diaminooctane, 1,9-diaminononane, 1,10-diaminodecane (DMD), 1,11-diaminoundecane, 1,12-diaminododecane (DDD), 1,16-hexadecamethylenediamine, 1,3-bis(3-aminopropyl)-tetramethyldisiloxane, trans-1,4-diaminocyclohexane (CHDA), isophoronediamine (IPDA), bicyclo[2.2.2] octane-1,4-diamine and combinations thereof. Other aliphatic diamines suitable for practicing the invention include those having six to twelve carbon atoms or a combination of longer chain and shorter chain diamines so long as both developability and flexibility are maintained. Long chain aliphatic diamines may increase flexibility.

In one embodiment, a suitable diamine for forming the soluble polymer can include an alicyclic diamine (can be fully or partially saturated), such as a cyclobutane diamine (e.g., cis- and trans-1,3-diaminocyclobutane, 6-amino-3-azaspiro[3.3]heptane, and 3,6-diaminospiro[3.3]heptane), bicyclo[2.2.1]heptane-1,4-diamine, isophoronediamine, and bicyclo[2.2.2]octane-1,4 diamine. Other alicyclic diamines can include cis-1,4 cyclohexane diamine, trans-1,4 cyclohexane diamine, 1,4-bis(aminomethyl)cyclohexane, 4,4'-methylenebis(cyclohexylamine), 4,4'-methylenebis(2-methyl-cyclohexylamine), bis(aminomethyl)norbornane.

In one embodiment, a suitable diamine for forming the soluble polymer can include a fluorinated aromatic diamine, such as 2,2'-bis(trifluoromethyl) benzidine (TFMB), trifluoromethyl-2,4-diaminobenzene, trifluoromethyl-3,5-diaminobenzene, 2,2'-bis-(4-aminophenyl)-hexafluoro propane, 4,4'-diamino-2,2'-trifluoromethyl diphenyloxide, 3,3'-diamino-5,5'-trifluoromethyl diphenyloxide, 9,9'-bis(4-aminophenyl)fluorene, 4,4'-trifluoromethyl-2,2'-diaminobiphenyl, 4,4'-oxy-bis-[2-trifluoromethyl)benzene amine] (1,2,4-OBABTF), 4,4'-oxy-bis-[3-trifluoromethyl) benzene amine], 4,4'-thio-bis-[(2-trifluoromethyl)benzene-amine], 4,4'-thiobis[(3-trifluoromethyl)benzene amine], 4,4'-sulfoxyl-bis-[(2-trifluoromethyl)benzene amine, 4,4'-sulfoxyl-bis-[(3-trifluoromethyl)benzene amine], 4,4'-keto-bis-[(2-trifluoromethyl)benzene amine], 1,1-bis[4'-(4"-amino-2"-trifluoromethylphenoxy)phenyl]cyclopentane, 1,1-bis[4'-(4"-amino-2"-trifluoromethylphenoxy)phenyl]cyclohexane, 2-trifluoromethyl-4,4'-diaminodiphenyl ether; 1,4-(2'-trifluoromethyl-4',4"-diaminodiphenoxy)-benzene, 1,4-bis(4'-aminophenoxy)-2-[(3',5'-ditrifluoromethyl)phenyl]benzene, 1,4-bis[2'-cyano-3'("4-amino phenoxy)phenoxy]-2-[(3',5'-ditrifluoro-methyl)phenyl]benzene (6FC-diamine), 3,5-diamino-4-methyl-2',3',5',6'-tetrafluoro-4'-trifluoromethyldiphenyloxide, 2,2-Bis[4'(4"-aminophenoxy) phenyl]phthalein-3',5'-bis(trifluoromethyl)anilide (6FADAP) and 3,3',5,5'-tetrafluoro-4,4'-diamino-diphenylmethane (TFDAM).

Other useful diamines for forming the soluble polymer can include p-phenylenediamine (PPD), m-phenylenediamine (MPD), 2,5-dimethyl-1,4-diaminobenzene, 2,5-dimethyl-1,4-phenylenediamine (DPX), 2,2-bis-(4-aminophenyl) propane, 1,4-naphthalenediamine, 1,5-naphthalenediamine, 4,4'-diaminobiphenyl, 4,4"-diamino terphenyl, 4,4'-diamino benzanilide, 4,4'-diaminophenyl benzoate, 4,4'-diaminobenzophenone, 4,4'-diaminodiphenylmethane (MDA), 4,4'-diaminodiphenyl sulfide, 4,4'-diaminodiphenyl sulfone, 3,3'-diaminodiphenyl sulfone, bis-(4-(4-aminophenoxy)phenyl sulfone (BAPS), 4,4'-bis-(aminophenoxy)biphenyl (BAPB), 4,4'-diaminodiphenyl ether (ODA), 3,4'-diaminodiphenyl ether, 4,4'-diaminobenzophenone, 4,4'-isopropylidenedianiline, 2,2'-bis-(3-aminophenyl)propane, N,N-bis-(4-aminophenyl)-n-butylamine, N,N-bis-(4-aminophenyl) methylamine, 1,5-diaminonaphthalene, 3,3'-dimethyl-4,4'-diaminobiphenyl, m-amino benzoyl-p-amino anilide, 4-aminophenyl-3-aminobenzoate, N,N-bis-(4-aminophenyl) aniline, 2,4-diaminotoluene, 2,5-diaminotoluene, 2,6-diaminotoluene, 2,4-diamine-5-chlorotoluene, 2,4-diamine-6-chlorotoluene, 2,4-bis-(beta-amino-t-butyl) toluene, bis-(p-beta-amino-t-butyl phenyl) ether, p-bis-2-(2-methyl-4-aminopentyl) benzene, m-xylylene diamine, and p-xylylene diamine.

Other useful diamines for forming the soluble polymer can include 1,2-bis-(4-aminophenoxy)benzene, 1,3-bis-(4-aminophenoxy) benzene (RODA), 1,2-bis-(3-aminophenoxy)benzene, 1,3-bis-(3-aminophenoxy) benzene, 1-(4-aminophenoxy)-3-(3-aminophenoxy) benzene, 1,4-bis-(4-aminophenoxy) benzene, 1,4-bis-(3-aminophenoxy) benzene, 1-(4-aminophenoxy)-4-(3-aminophenoxy) benzene, 2,2-bis-(4-[4-aminophenoxy]phenyl) propane (BAPP), 2,2'-bis-(4-phenoxy aniline) isopropylidene, 2,4,6-trimethyl-1,3-diaminobenzene and 2,4,6-trimethyl-1,3-diaminobenzene.

Dianhydrides

In one embodiment, any number of suitable dianhydrides can be used in forming the soluble polymer. The dianhydrides can be used in their tetra-acid form (or as mono, di, tri, or tetra esters of the tetra acid), or as their diester acid halides (chlorides). However, in some embodiments, the dianhydride form can be preferred, because it is generally more reactive than the acid or the ester.

Examples of suitable dianhydrides include 3,3',4,4'-biphenyltetracarboxylic dianhydride (BPDA), 1,2,5,6-naphthalene tetracarboxylic dianhydride, 1,4,5,8-naphthalene tetracarboxylic dianhydride, 2,3,6,7-naphthalene tetracarboxylic dianhydride, 2-(3',4'-dicarboxyphenyl) 5,6-dicarboxybenzimidazole dianhydride, 2-(3',4'-dicarboxyphenyl) 5,6-dicarboxybenzoxazole dianhydride, 2-(3',4'-dicarboxyphenyl) 5,6-dicarboxybenzothiazole dianhydride, 2,2',3,3'-benzophenone tetracarboxylic dianhydride, 2,3,3',4'-benzophenone tetracarboxylic dianhydride, 3,3',4,4'-benzophenone tetracarboxylic dianhydride (BTDA), 2,2',3,3'-biphenyltetracarboxylic dianhydride, 2,3,3',4'-biphenyltetracarboxylic dianhydride, bicyclo-[2,2,2]-octen-(7)-2,3,5,6-tetracarboxylic-2,3,5,6-dianhydride, 4,4'-thio-diphthalic anhydride, bis (3,4-dicarboxyphenyl) sulfone dianhydride, bis (3,4-dicarboxyphenyl) sulfoxide dianhydride (DSDA), bis (3,4-dicarboxyphenyl oxadiazole-1,3,4) p-phenylene dianhydride, bis (3,4-dicarboxyphenyl) 2,5-oxadiazole 1,3,4-dianhydride, bis 2,5-(3',4'-dicarboxydiphenylether) 1,3,4-oxadiazole dianhydride, 4,4'-oxydiphthalic anhydride (ODPA), bis (3,4-dicarboxyphenyl) thio ether dianhydride, bisphenol A dianhydride (BPADA), bisphenol S dianhydride, bis-1,3-isobenzofurandione, 1,4-bis(4,4'-oxyphthalic anhydride) benzene, bis (3,4-dicarboxyphenyl) methane dianhydride, cyclopentadienyl tetracarboxylic dianhydride, ethylene tetracarboxylic dianhydride, perylene 3,4,9,10-tetracarboxylic dianhydride, pyromellitic dianhydride (PMDA), tetrahydrofuran tetracarboxylic dianhydride, 1,3-bis-(4,4'-oxydiphthalic anhydride) benzene, 2,2-bis(3,4-dicarboxyphenyl)propane dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, phenanthrene-1,8,9,10-tetracarboxylic dianhydride, pyrazine-2,3,5,6-tetracarboxylic dianhydride, benzene-1,2,3,4-tetracarboxylic dianhydride and thiophene-2,3,4,5-tetracarboxylic dianhydride.

In one embodiment, a suitable dianhydride can include an alicyclic dianhydride, such as cyclobutane-1,2,3,4-tetracarboxylic diandydride (CBDA), 1,2,4,5-cyclohexanetetracarboxylic dianhydride, 1,2,3,4-cyclohexanetetracarboxylic dianhydride, 1,2,3,4-tetramethyl-1,2,3,4-cyclobutanetetracarboxylic dianhydride, 1,2,3,4-cyclopentanetetracarboxylic dianhydride (CPDA), hexahydro-4,8-ethano-1H,3H-benzo[1,2-c:4,5-c']difuran-1,3,5,7-tetrone (BODA), 3-(carboxymethyl)-1,2,4-cyclopentanetricarboxylic 1,4:2,3-dianhydride (TCA) and meso-butane-1,2,3,4-tetracarboxylic dianhydride. In one embodiment, an alicyclic dianhydride can be present in an amount of about 70 mole percent or less, based on the total dianhydride content of the polymer.

In one embodiment, a suitable dianhydride for forming the soluble polymer can include a fluorinated dianhydride, such as 4,4'-(hexafluoroisopropylidene)diphthalic anhydride (6FDA) and 9,9-bis (trifluoromethyl)-2,3,6,7-xanthene tetracarboxylic dianhydride.

In one embodiment, useful acyl chloride-containing monomers for forming poly(amide-imides) can include terephthaloyl chloride (TPCl), isophthaloyl chloride (IPCl), biphenyl dicarbonyl chloride (BPCl), naphthalene dicarbonyl chloride, terphenyl dicarbonyl chloride, 2-fluoro-terephthaloyl chloride and trimellitic anhydride.

In one embodiment, poly(ester-imides) can further include polyols which can react with carboxylic acid or the ester acid halides to generate ester linkages.

The dihydric alcohol component may be almost any alcoholic diol containing two esterifiable hydroxyl groups. Mixtures of suitable diols may also be included. Suitable diols for use herein include for example, ethylene glycol, propylene glycol, 1,4-butane diol, 1,5-pentane diol, neopentyl glycol, etc.

The polyhydric alcohol component may be almost any polyhydric alcohol containing at least 3 esterifiable hydroxyl groups. In one embodiment, mixtures of polyhydric alcohols may be employed. Suitable polyhydric alcohols include, for example, tris(2-hydroxyethyl) isocyanurate, glycerine, 1,1,1-trimethylolethane, 1,1,1-trimethylolpropane, and their mixtures.

In some cases, useful diamine and dianhydride monomers contain ester groups. Examples of these monomers are diamines such as 4-aminophenyl 4-aminobenzoate, 4-amino-3-methylphenyl-4-aminobenzoate and dianhydrides such as p-phenylene bis(trimellitate) dianhydride.

In some cases, useful diamine and dianhydride monomers contain amide groups. Examples of these monomers are diamines such as 4, 4'-diaminobenzamide (DABAN), and dianhydrides such as N,N'-(2,2'-Bis(trifluoromethyl)-[1,1'-biphenyl]-4,4'-diyl)bis(1,3-dioxo-1,3-dihydroisobenzofuran-5-carboxamide) and N,N'-(9H-Fluoren-9-ylidenedi-4,1-phenylene)bis[1,3-dihydro-1,3-dioxo-5-isobenzofurancarboxamide].

Higher order copolymers having an imide group can include any of the monomers described above.

Crosslinking Precursors

In one embodiment, crosslinking precursors are used in the coating solutions that form polymer films. By crosslinking the polymer, the polymer film may have improved mechanical properties, as well as improved chemical resistance. Crosslinking precursors can include polyetheramines, such as Jeffamine® D-230, Jeffamine® D-400, Jeffamine® D-2000, Jeffamine® D-2010, Jeffamine® D-4000, Jeffamine® ED-600, Jeffamine® ED-900, Jeffamine® D-2003, Jeffamine® EDR-148, Jeffamine® THF-100, Jeffamine® THF-170, Jeffamine® SD-2001, Jeffamine® D-205 and Jeffamine® RFD-270.

In one embodiment, crosslinking precursors can include aromatic primary diamines, such as m-xylylene diamine, and p-xylylene diamine.

In one embodiment, crosslinking precursors can include aliphatic primary diamines, such as 1,2-diaminoethane, 1,6- diaminohexane, 1,4-diaminobutane, 1,7-diaminoheptane, 1,8-diaminooctane, 1,9-diaminononane, 1,10-diaminodecane (DMD), 1,11-diaminoundecane, 1,12-diaminododecane (DDD), 1,16-hexadecamethylenediamine, 1,3-bis(3-aminopropyl)-tetramethyldisiloxane, isophoronediamine, bicyclo[2.2.2]octane-1,4-diamine and combinations thereof. Other aliphatic diamines suitable for practicing the invention include those having six to twelve carbon atoms or a combination of longer chain and shorter chain diamines or cycloaliphatic diamines.

In one embodiment, crosslinking precursors can include secondary amines, such as piperazine, N,N'-diisopropylethylenediamine, N,N'-diisopropyl-1,3-propanediamine and N,N'-dimethyl-1,3-propanediamine, and triamines, such as 2,4,6-triaminopyrimidine (TAP), melamine, diethylenetriamine, Jeffamine® T-403, Jeffamine® T-3000, Jeffamine® T-5000. In addition, many diamines that may be used as a diamine monomer for polymers, as described above, may also be useful as crosslinking precursors.

In one embodiment, crosslinking precursors can include one or more amine groups that, individually, are either reactive or passivated towards crosslinking of the polymer. When containing an amine group that is passivated, the crosslinking precursor can subsequently be chemically converted, thermally converted, photo-converted or dissociated to form at least two reactive amines.

In one embodiment, a crosslinking precursor can contain alkyl chains as passivating groups, such as N-alkyl or N,N-dialkyl chains, for example, methyl and tert-butyl chains. In one embodiment, a crosslinking precursor can contain an aromatic passivating group, such as N-aryl and N,N-diaryl groups. In one embodiment, a crosslinking precursor can be a compound that contains a benzyl passivating group. In one embodiment a crosslinking precursor can be a compound that contains a silyl derivative as the passivating group, such as tert-butyldiphenylsilyl. Many functional groups can act as protecting groups for amines towards soluble polymers having an imide group. See, for example, P. G. M. Wuts and T. W. Greene, *Greene's Protective Groups in Organic Synthesis*, 4th Ed., John Wiley & Sons, Inc. (2007) ("Greene's").

In one embodiment, a crosslinking precursor can contain carbamates as passivating groups. Carbamate passivating groups can be converted to form reactive amines by a variety of methods. Many carbamates can be converted to form reactive amines through the application of heat at temperatures typically greater than 150° C. A variety of chemical routes can also be used to convert a carbamate functional group to form a reactive amine. For example, the introduction of a base, such as tert-butyl alcohol, or an acid, such as phosphoric acid or trifluoroacetic acid, can be used to convert the carbamate to form a reactive amine. Photo-induced reactions can also be used to cleave carbamates to form reactive amines. A variety of methods of converting a range of carbamates are described in Greene's. In one embodiment, a crosslinking precursor can be a compound that contains carbamate passivating groups that are thermally cleavable, such as tert-butyloxycarbonyl, fluorenylmethoxycarbonyl, and benzyl carbamate, or photo-cleavable, such as 3,5-dimethoxybenzyl carbamate, m-nitrophenyl carbamate, and o-nitrobenzyl carbamate.

In one embodiment, a crosslinking precursor contain an amide passivating group that can be cleaved to form a reactive amine through the introduction of a different chemical species. For example, the different chemical species can include a base such as sodium or potassium hydroxide, ammonia, or a tertiary amine. In other instances, acids such as hydrochloric acid, or enzymes such as penicillin acylase or α-chymotrypsin can be used to cleave the amide to form a reactive amine.

In one embodiment, a crosslinking precursor containing an amide passivating group can be photo-cleaved, such as by irradiating with 245 nm light, or thermally cleaved at temperatures of greater than 65° C. A broad range of amides, such as those described in Greene's, can be used as crosslinking precursors. In one embodiment, a crosslinking precursor can be a compound that contains an amide passivating group, such as acetamide, trifluoroacetamide, formamide, sulfonamide, such as p-toluenesulfonamide, trichloroacetamide, chloroacetamide, phenylacetamide, 3-phenylpropanamide, 3-pyridylcarboxamide, N-benzoylphenylalanyl, and benzamide.

In one embodiment, a crosslinking precursor can be an ammonium salt made from an acid such as acetic acid, butyric acid, pivalic acid, hydrochloric acid or sulfuric acid. An ammonium salt which can be used to passivate an amine in the crosslinking precursor can be formed by the addition of organic and/or mineral Brønsted acids. The direct reaction of the acid and the crosslinking precursor, containing an amine, will form the ammonium salt. The ammonium salt can be dissociated to allow for crosslinking by the application of heat. The kinetic inhibition is also controlled by the acid-ammonium equilibrium constant. If there is not sufficient acid in solution, as determined by the acid-ammonium equilibrium constant, the ammonium salt can be dissociated to form a reactive amine in the crosslinking precursor. In one embodiment, an ammonium salt can be made from the reaction of the amine with acetic acid or trifluoroacetic acid, and then dissociated with heat.

In one embodiment, the crosslinking precursor is selected from a single multi-functional precursor, a combination of multiple single-functional precursors, or a mixture thereof.

In one embodiment, the crosslinking precursor is present in the coating solution in an amount in the range of from 0.01 to 90 mol %, or from 5 to 80 mol %, or from 5 to 40 mol % based on the total moles of soluble polymer and crosslinking precursor in the coating solution. For example, a coating solution with 30 mol % of the crosslinking precursor will have 70 mol % of the soluble polymer.

Colorants

In one embodiment, the polymer film contains about 1 to about 40 wt % of a colorant, such as a pigment or dye. In some embodiments, the polymer film contains about 1 to about 40 wt % of a mixture of pigments and dyes. In some embodiments, the polymer film contains between and including any two of the following: 1, 5, 10, 15, 20, 25, 30, 35 and 40 wt % colorant.

Virtually any pigment (or combination of pigments) can be used in the performance of the present invention. In some embodiments, useful pigments include but are not limited to the following: Barium Lemon Yellow, Cadmium Yellow Lemon, Cadmium Yellow Lemon, Cadmium Yellow Light, Cadmium Yellow Middle, Cadmium Yellow Orange, Scarlet Lake, Cadmium Red, Cadmium Vermilion, Alizarin Crimson, Permanent Magenta, Van Dyke brown, Raw Umber Greenish, or Burnt Umber. In some embodiments, useful black pigments include: cobalt oxide, Fe—Mn—Bi black, Fe—Mn oxide spinel black, $(Fe,Mn)_2O_3$ black, copper chromite black spinel, lampblack, bone black, bone ash, bone char, hematite, black iron oxide, micaceous iron oxide, black complex inorganic color pigments (CICP), $(Ni,Mn,Co)(Cr,Fe)_2O_4$ black, Aniline black, Perylene black, Anthraquinone black, Chromium Green-Black Hematite, Chrome Iron Oxide, Pigment Green 17, Pigment Black 26, Pigment Black 27, Pigment Black 28, Pigment Brown 29, Pigment Brown 35, Pigment Black 30, Pigment Black 32, Pigment Black 33 or mixtures thereof.

In some embodiments, the pigment is lithopone, zinc sulfide, barium sulfate, cobalt oxide, yellow iron oxide, orange iron oxide, red iron oxide, brown iron oxide, hematite, black iron oxide, micaceous iron oxide, chromium (III) green, ultramarine blue, ultramarine violet, ultramarine pink, cyanide iron blue, cadmium pigments or lead chromate pigments.

In some embodiments, the pigment is complex inorganic color pigments (CICP) such as spinel pigments, rutile pigments, zircon pigments or bismuth vanadate yellow. In some embodiments, useful spinel pigments include but are not limited to: $Zn(Fe,Cr)_2O_4$ brown, $CoAl_2O_4$ blue, $Co(AlCr)_2O_4$ blue-green, $Co_2TiO_4$ green, $CuCr_2O_4$ black or $(Ni,Mn,Co)(Cr,Fe)_2O_4$ black. In some embodiments, useful rutile pigments include but are not limited to: Ti—Ni—Sb yellow, Ti—Mn—Sb brown, Ti—Cr—Sb buff, zircon pigments or bismuth vanadate yellow.

In another embodiment, the pigment is an organic pigment. In some embodiments, useful organic pigments include but are not limited to: Aniline black (Pigment Black 1), Anthraquinone black, Monoazo type, Diazo type, Benzimidazolones, Diarylide yellow, Monoazo yellow salts, Dinitaniline orange, Pyrazolone orange, Azo red, Naphthol red, Azo condensation pigments, Lake pigments, Copper Phthalocyanine blue, Copper Phthalocyanine green, Quinacridones, Diaryl Pyrrolopyrroles, Aminoanthraquinone pigments, Dioxazines, Isoindolinones, Isoindolines, Quinophthalones, phthalocyanine pigments, idanthrone pigments, pigment violet 1, pigment violet 3, pigment violet 19 or pigment violet 23. In yet another embodiment, the organic pigment is a Vat dye pigment, such as but not limited to: perylene, perylene black, perinones or thioindigo. A uniform dispersion of isolated, individual pigment particles (aggregates) tends to produce uniform color intensity. In some embodiments, the pigment is milled. In some embodiments, the mean particle size of the pigment is between (and optionally including) any two of the following sizes: 0.2, 0.3, 0.4, 0.5, 0.6, 0.7, 0.8, 0.9 and 1.0 µm. In some embodiments, luminescent (fluorescent or phosphorescent), or pearlescent pigments can be used, alone, or in combination with other pigments or dyes.

In one embodiment, the colorant may include low conductivity carbon black. In some embodiments, the colorant contains between and including any two of the following: 1, 5, 10, 15 and 20 wt % low conductivity carbon black. In yet another embodiment, the colorant includes about 2 to about 9 wt % low conductivity carbon black.

Low conductivity carbon black is intended to mean, channel type black, furnace black or lamp black. In some embodiments, the low conductivity carbon black is a surface oxidized carbon black. One method for assessing the extent of surface oxidation (of the carbon black) is to measure the carbon black's volatile content. The volatile content can be measured by calculating weight loss when calcined at 950° C. for 7 minutes. Generally speaking, a highly surface oxidized carbon black (high volatile content) can be readily dispersed into a polymer precursor solution, which in turn can be imidized into a (well dispersed) filled polymer of the present disclosure. It is thought that if the carbon black particles (aggregates) are not in contact with each other, then electron tunneling, electron hopping or other electron flow mechanism are generally suppressed, resulting in lower electrical conductivity. In some embodiments, the low conductivity carbon black has a volatile content greater than or equal to 1%. In some embodiments, the low conductivity carbon black has a volatile content greater than or equal to 5, 9, or 13%. In some embodiments, furnace black may be surface treated to increase the volatile content. Typically, a low conductivity carbon black has a pH less than about 6.

A uniform dispersion of isolated, carbon black particles (aggregates) not only decreases the electrical conductivity, but additionally tends to produce uniform color intensity. In some embodiments, the low conductivity carbon black is milled. In some embodiments, the mean particle size of the low conductivity carbon black is between (and optionally including) any two of the following sizes: 0.2, 0.3, 0.4, 0.5, 0.6, 0.7, 0.8, 0.9 and 1.0 µm.

Matting Agents

In one embodiment, the polymer film contains about 0.5 to about 20 wt % of a matting agent selected from the group consisting of silica, alumina, zirconia, boron nitride, barium sulfate, polyimide particles, calcium phosphate, talc or mixtures thereof. In some embodiments, the polymer film contains between and including any two of the following: 0.5, 1, 5, 10, 15 and 20 wt % matting agent. In one embodiment, a matting agent has a particle size in the range of from about 2 to about 10 µm, or from about 3 to about 9 µm, or from about 5 to about 7 µm.

Submicron Particles

In one embodiment, the polymer film contains up to about 39 wt % of at least one submicron particle, such as a submicron fumed metal oxide (also known as pyrogenic metal oxide) or a submicron colloidal metal oxide or a mixture thereof. In some embodiments, the submicron fumed metal oxide is fumed alumina, fumed silica or mixtures thereof. In one embodiment, the polymer film includes up to about 20 wt %, or up to about 10 wt % of at least one submicron particle. In one embodiment, a submicron particle has a particle size of less than about 1 µm. In one embodiment, a submicron particle has a particle size in a range of from about 0.01 to about 1 µm, or from about 0.05 to about 0.5 µm.

The particle sizes of the submicron particles, carbon blacks and matting agents can be measured in the slurries by laser diffraction using a particle size analyzer, such as a LA-930 (Horiba, Instruments, Inc., Irvine CA), Mastersizer 3000 (Malvern Instruments, Inc., Westborough, MA) or LS-230 (Beckman Coulter, Inc., Indianapolis, IN). However, due to the tendency of the submicron particles to flocculate, it is sometimes more accurate to measure particle size of these milled slurries by observing in an optical microscope.

Polymer Films

In one embodiment, a polymer film can be produced by combining a diamine and a dianhydride (monomer or other polymer precursor form) together with a solvent to form a polyamic acid (also called a polyamide acid) solution. The dianhydride and diamine can be combined in a molar ratio of about 0.90 to 1.10. The molecular weight of the polyamic acid formed therefrom can be adjusted by adjusting the molar ratio of the dianhydride and diamine.

Useful methods for producing polyamic acid solutions in accordance with the present invention can be found in U.S. Pat. Nos. 5,166,308 and 5,298,331, which are incorporate by reference into this specification for all teachings therein. Numerous variations are also possible, such as, (a) A method wherein the diamine components and dianhydride components are preliminarily mixed together and then the mixture is added in portions to a solvent while stirring.

(b) A method wherein a solvent is added to a stirring mixture of diamine and dianhydride components. (contrary to (a) above)

(c) A method wherein diamines are exclusively dissolved in a solvent and then dianhydrides are added thereto at such a ratio as allowing to control the reaction rate.

(d) A method wherein the dianhydride components are exclusively dissolved in a solvent and then amine components are added thereto at such a ratio to allow control of the reaction rate.

(e) A method wherein the diamine components and the dianhydride components are separately dissolved in solvents and then these solutions are mixed in a reactor.

(f) A method wherein the polyamic acid with excessive amine component and another polyamic acid with excessive dianhydride component are preliminarily formed and then reacted with each other in a reactor, particularly in such a way as to create a non-random or block copolymer.

(g) A method wherein a specific portion of the amine components and the dianhydride components are first reacted and then the residual diamine components are reacted, or vice versa.

(h) A method wherein the components are added in part or in whole in any order to either part or whole of the solvent, also where part or all of any component can be added as a solution in part or all of the solvent.

(i) A method of first reacting one of the dianhydride components with one of the diamine components giving a first polyamic acid. Then reacting another dianhydride component with another amine component to give a second polyamic acid. Then combining the amic acids in any one of a number of ways prior to imidization.

In one embodiment, a polyamic acid solution can be combined with conversion chemicals like: (i) one or more dehydrating agents, such as, aliphatic acid anhydrides and/or aromatic acid anhydrides (acetic anhydride, propionic anhydride, n-butyric anhydride, benzoic anhydride, trifluoroacetic anhydride and others); and (ii) one or more catalysts, such as, aliphatic tertiary amines (triethyl amine, etc.), aromatic tertiary amines (dimethyl aniline, etc.) and heterocyclic tertiary amines (pyridine, alpha, beta and gamma picoline (2-methylpyridine, 3-methylpyridine, 4-methylpyridine), isoquinoline, etc.). The anhydride dehydrating material is often used in molar excess compared to the amount of amide acid groups in the polyamic acid. The amount of acetic anhydride used is typically about 2.0-4.0 moles per equivalent (repeat unit) of polyamic acid. Generally, a comparable amount of tertiary amine catalyst is used.

In one embodiment, a conversion chemical can be an imidization catalyst (sometimes called an "imidization accelerator") that can help lower the imidization temperature and shorten the imidization time. Typical imidization catalysts can range from bases such as imidazole, 1-methylimidazole, 2-methylimidazole, 1,2-dimethylimidazole, 2-phenylimidazole, benzimidazole, isoquinoline, substituted pyridines such as methyl pyridines, lutidine, and trialkylamines and hydroxy acids such as isomers of hydroxybenzoic acid. The ratio of these catalysts and their concentration in the polyamic acid layer will influence imidization kinetics and the film properties.

In one embodiment, the polyamic acid solution can be heated, optionally in the presence of the imidization catalyst, to partially or fully imidize the polyamic acid, converting it to a polymer having an imide group. Temperature, time, and the concentration and choice of imidization catalyst can impact the degree of imidization of the polyamic acid solution. Preferably, the solution should be substantially imidized. In one embodiment, for a substantially polymerized solution, greater than 85%, greater than 90%, or greater than 95% of the amic acid groups are converted to the polymer having an imide group, as determined by infrared spectroscopy.

In one embodiment, the solvated mixture (the substantially imidized solution) can be cast to form a polymer film. In another embodiment, the solvated mixture (the first substantially imidized solution) can be precipitated with an antisolvent, such as water or alcohols (e.g., methanol, ethanol, isopropyl alcohol), and the solid polymer resin can be isolated. For instance, isolation can be achieved through filtration, decantation, centrifugation and decantation of the supernatant liquid, distillation or solvent removal in the vapor phase, or by other known methods for isolating a solid precipitate from a slurry. In one embodiment, the precipitate can be washed to remove the catalyst. After washing, the precipitate may be substantially dried, but need not be completely dry. The polymer precipitate can be re-dissolved in a second solvent, such as methyl isobutyl ketone (MIBK), methyl ethyl ketone (MEK), ethyl acetate, methyl acetate, ethyl formate, methyl formate, tetrahydrofuran, acetone, DMAc, NMP and mixtures thereof, to form a second substantially imidized solution (a casting solution), which can be cast to form a polymer film.

In one embodiment, a substantially polymerized solution is formed using monomers (diamines or dianhydrides) with structural characteristics important for solubility, including flexible linkages, such as, but not limited to, aliphatic spacers, ethers, thioethers, substituted amines, amides, esters, and ketones, weak intermolecular interactions, bulky substitutions, non-coplanarity, non-linearity and asymmetry. Examples of diamines that incorporate some of these characteristics are aliphatic diamines, such as HMD, CHDA and IPDA, and aromatic diamines, such as MTB TFMB, MPD, RODA, BAPP, and 3,4-ODA. Examples of dianhydrides that incorporate some of these characteristics are 6FDA, BPADA, ODPA, DSDA and BODA.

In one embodiment, the solvated mixture (the substantially imidized solution) can be mixed with a crosslinking precursor and a colorant, such as a pigment or a dye, and then cast to form a polymer film. In one embodiment, the colorant may be a low conductivity carbon black. In another embodiment, the solvated mixture (the first substantially imidized solution) can be precipitated with an antisolvent, such as water or alcohols (e.g., methanol, ethanol, isopropyl alcohol). In one embodiment, the precipitate can be washed to remove the catalyst. After washing, the precipitate may be substantially dried, but need not be completely dry. The polymer precipitate can be re-dissolved in a second solvent, such as methyl isobutyl ketone (MIBK), methyl ethyl ketone (MEK), tetrahydrofuran (THF), cyclopentanone, ethyl acetate, acetone, DMAc, NMP and mixtures thereof, to form a second substantially imidized solution (a casting solution). To the second substantially imidized solution, a crosslinking precursor and a colorant can be added, which can then be cast to form a polymer film. In one embodiment, a polymer film contains a crosslinked polymer in a range of from about 80 to about 99 wt %. In some embodiments, the polymer film contains between and including any two of the following: 80, 85, 90, 95 and 99 wt % crosslinked polymer. In yet another embodiment, the polymer film contains about 91 to about 98 wt % crosslinked polymer.

In one embodiment, poly(amide-imides) can be formed by the reaction of acyl chlorides with diamines and anhydrides.

In one embodiment, poly(ester-imides), or poly(amide-imides), can be formed using ester-containing, or amide-containing, diamines or dianhydrides in similar processes as those described above. In one embodiment, a poly(ester-imide) can be formed by direct reaction of an ester-containing diamine or dianhydride. In one embodiment, a poly(amide-imide) can be formed by direct reaction of an amide-containing diamine or dianhydride.

In one embodiment, poly(ester-imides) can be formed by esterification of diols with carboxylic acid containing monomers with imide groups, as described in U.S. Pat. No. 4,383,105.

Crosslinking of the polymer can be determined by a variety of methods. In one embodiment, the gel fraction of polymer may be determined by using an equilibrium swelling method, comparing the weight of a dried film before and after crosslinking. In one embodiment, a crosslinked polymer can have a gel fraction in the range of from about 20 to about 100%, or from about 40 to about 100%, or from about 50 to about 100%, or from about 70 to about 100%, or from about 85 to about 100%. In one embodiment, the crosslinked network can be identified using rheological methods. An oscillatory time sweep measurement at specific strain, frequency, and temperature can be used to confirm the formation of crosslinked network. Initially, the loss modulus (G") value is higher than the storage modulus (G') value, indicating that the polymer solution behaves like a viscous liquid. Over time, the formation of a crosslinked polymer network is evidenced by the crossover of G' and G" curves. The crossover, referred to as the "gel point", represents when the elastic component predominates over the viscous The casting solution can further comprise any one of a number of additives, such as processing aids (e.g., oligomers), antioxidants, light stabilizers, flame retardant additives, anti-static agents, heat stabilizers, ultraviolet absorbing agents, inorganic fillers or various reinforcing agents. Inorganic fillers can include thermally conductive fillers, metal oxides, inorganic nitrides and metal carbides, and electrically conductive fillers like metals. Common inorganic fillers are alumina, silica, diamond, clay, talc, sepiolite, boron nitride, aluminum nitride, titanium dioxide, dicalcium phosphate, and fumed metal oxides. Low color organic fillers, such as polydialkylfluorenes, can also be used.

In one embodiment, an electrically conductive filler is carbon black. In one embodiment, the electrically conductive filler is selected from the group consisting of acetylene blacks, super abrasion furnace blacks, conductive furnace blacks, conductive channel type blacks, carbon nanotubes, carbon fibers, fine thermal blacks and mixtures thereof. As described above for low conductivity carbon black, oxygen complexes on the surface of the carbon particles act as an electrically insulating layer. Thus, low volatility content is generally desired for high conductivity. However, it is also necessary to consider the difficulty of dispersing the carbon black. Surface oxidation enhances deagglomeration and dispersion of carbon black. In some embodiments, when the electrically conductive filler is carbon black, the carbon black has a volatile content less than or equal to 1%.

Fillers can have a size of less than 550 nm in at least one dimension. In other embodiments, the filler can have a size of less than 500, less than 450, less than 400, less than 350, less than 300, less than 250, or less than 200 nm (since fillers can have a variety of shapes in any dimension and since filler shape can vary along any dimension, the "at least one dimension" is intended to be a numerical average along that dimension). The average aspect ratio of the filler can be 1 or greater. In some embodiments, the sub-micron filler is selected from a group consisting of needle-like fillers (acicular), fibrous fillers, platelet fillers, polymer fibers, and mixtures thereof. In one embodiment, the sub-micron filler is substantially non-aggregated. The sub-micron filler can be hollow, porous, or solid. In one embodiment, the sub-micron fillers of the present disclosure exhibit an aspect ratio of at least 1, at least 2, at least 4, at least 6, at least 8, at least 10, at least 12, or at least 15 to 1.

In some embodiments, sub-micron fillers are 100 nm in size or less. In some embodiments, the fillers are spherical or oblong in shape and are nanoparticles. In one embodiment, sub-micron fillers can include inorganic oxides, such as oxides of silicon, aluminum and titanium, hollow (porous) silicon oxide, antimony oxide, zirconium oxide, indium tin oxide, antimony tin oxide, mixed titanium/tin/zirconium oxides, and binary, ternary, quaternary and higher order composite oxides of one or more cations selected from silicon, titanium, aluminum, antimony, zirconium, indium, tin, zinc, niobium and tantalum. In one embodiment, nanoparticle composites (e.g., single or multiple core/shell structures) can be used, in which one oxide encapsulates another oxide in one particle.

In one embodiment, sub-micron fillers can include other ceramic compounds, such as boron nitride, aluminum nitride, ternary or higher order compounds containing boron, aluminum and nitrogen, gallium nitride, silicon nitride, aluminum nitride, zinc selenide, zinc sulfide, zinc telluride, silicon carbide, and their combinations, or higher order compounds containing multiple cations and multiple anions.

In one embodiment, solid silicon oxide nanoparticles can be produced from sols of silicon oxides (e.g., colloidal dispersions of solid silicon oxide nanoparticles in liquid media), especially sols of amorphous, semi-crystalline, and/or crystalline silica. Such sols can be prepared by a variety of techniques and in a variety of forms, which include hydrosols (i.e., where water serves as the liquid medium), organosols (i.e., where organic liquids serves as the liquid medium), and mixed sols (i.e., where the liquid medium comprises both water and an organic liquid). See, e.g., descriptions of the techniques and forms disclosed in U.S. Pat. Nos. 2,801,185, 4,522,958 and 5,648,407. In one embodiment, the nanoparticle is suspended in a polar, aprotic solvent, such as, DMAC or other solvent compatible with polyamic acid or poly(amide amic acid). In another embodiment, solid nanosilica particles can be commercially obtained as colloidal dispersions or sols dispersed in polar aprotic solvents, such as for example DMAC-ST (Nissan Chemical America Corporation, Houston TX), a solid silica colloid in dimethylacetamide containing less than 0.5 percent water, with 20-21 wt % $SiO_2$, with a median nanosilica particle diameter, $d_{50}$, of about 16 nm.

In one embodiment, sub-micron fillers can be porous and can have pores of any shape. One example is where the pore comprises a void of lower density and low refractive index (e.g., a void containing air) formed within a shell of an oxide such as silicon oxide, i.e., a hollow silicon oxide nanoparticle. The thickness of the sub-micron fillers shell affects the strength of the sub-micron fillers. As the hollow silicon oxide particle is rendered to have reduced refractive index and increased porosity, the thickness of the shell decreases resulting in a decrease in the strength (i.e., fracture resistance) of the sub-micron fillers. Methods for producing such hollow silicon oxide nanoparticles are known, for example, as described in Japanese Patent Nos. 4406921B2 and 4031624B2. Hollow silicon oxide nanoparticles can be obtained from JGC Catalysts and Chemicals, LTD, Japan.

In one embodiment, sub-micron fillers can be coated with a coupling agent. For example, a nanoparticle can be coated with an aminosilane, phenylsilane, acrylic or methacrylic coupling agents derived from the corresponding alkoxysilanes. Trimethylsilyl surface capping agents can be introduced to the nanoparticle surface by reaction of the sub-micron fillers with hexamethyldisilazane. In one embodiment, sub-micron fillers can be coated with a dispersant. In one embodiment, sub-micron fillers can be coated with a combination of a coupling agent and a dispersant. Alternatively, the coupling agent, dispersant or a combination thereof can be incorporated directly into the polyimide film and not necessarily coated onto the sub-micron fillers.

In one embodiment, the substantially imidized polymer solution can be cast or applied onto a support, such as an endless belt or rotating drum, to form a film. Alternatively, it can be cast on a polymeric carrier such as PET, other forms of Kapton® polyimide film (e.g., Kapton® HN or Kapton® OL films) or other polymeric carriers. Next, the solvent containing-film can be converted into a film by heating to partially or fully remove the solvent. In some aspects of the invention, the film is separated from the carrier before drying to completion. Final drying steps can be performed with dimensional support or stabilization of the film. In other aspects, the film is heated directly on the carrier.

The thickness of the polymer film may be adjusted, depending on the intended purpose of the film or final application specifications. In one embodiment, the polymer film has a total thickness in a range of from about 10 to about 150 µm, or from about 10 to about 100 µm, or from about 25 to about 80 µm.

In one embodiment, the polymer film has a b* of less than about 1.25, or less than about 1.0 or less than about 0.8 for a film thickness of about 50 µm, when measured with a dual-beam spectrophotometer, using D65 illumination and 10-degree observer, in total transmission mode over a wavelength range of 360 to 780 nm. In one embodiment, the polymer film has a yellowness index (YI) of less than about 2.25, or less than about 2.0 or less than about 1.75 for a film thickness of about 50 µm, when measured using the procedure described by ASTM E313.

Applications

In one embodiment, a polymer film can be used in electronic device applications, such as a coverlay for a printed circuit board or other electronic components in an electronic device, providing protection from physical damage, oxidation and other contaminants that may adversely affect the function of the electronic components. Very thin coverlays of polymer films using crosslinked polymers are more chemically resistant and can resist etching during processing used in circuit production, while maintaining good optical properties.

In one embodiment, a photo-patternable polymer film can be used as a dielectric in electronic circuit applications. For example, after forming the polymer film, a light-shielding mask can be used to expose the polymer film in a desired pattern, where the exposed portions of the film are photo-crosslinked by irradiating the photo-sensitive polymer with light. The resulting polymer film will then have a large solubility difference between the exposed (crosslinked) regions of the film and the unexposed regions, allowing for easy removal of the unexposed regions.

In one embodiment, a polymer film can be used for a number of layers in an organic electronic device. Nonlimiting examples of such layers include device substrates, touch panels, substrates for color filter sheets, cover films, and others. The particular materials' properties requirements for each application are unique and may be addressed by appropriate composition(s) and processing condition(s) for the polymer films disclosed herein. Organic electronic devices that may benefit from having a coated film include, but are not limited to, (1) devices that convert electrical energy into radiation (e.g., a light-emitting diode, light emitting diode display, lighting device, luminaire, or diode laser), (2) devices that detect signals through electronics processes (e.g., photodetectors, photoconductive cells, photoresistors, photoswitches, phototransistors, phototubes, IR detectors, biosensors), (3) devices that convert radiation into electrical energy, (e.g., a photovoltaic device or solar cell), (4) devices that convert light of one wavelength to light of a longer wavelength, (e.g., a down-converting phosphor device); and (5) devices that include one or more electronic components that include one or more organic semi-conductor layers (e.g., a transistor or diode).

The advantageous properties of this invention can be observed by reference to the following examples that illustrate, but do not limit, the invention. All parts and percentages are by weight unless otherwise indicated.

EXAMPLES

Test Methods

Gel Fraction

Polymer gel fraction was measured using an equilibrium swelling method. A polymer film was cast from solution and dried on a hot plate at 80° C. for 20-25 minutes. The film was then further dried in a furnace heating from 120 to 250° C. (16° C./min) followed by holding at 250° C. for 20 minutes. Once cool, a piece of the film was weighed for its mass (typically 0.1-0.5 g) then immersed in ~100 ml of DMAc. The film was kept in the DMAc for 3-5 days, while the DMAc was replaced every day with fresh DMAc. After that time, the film was removed from the DMAc solution, dried on a hot plate at 80° C. for 10 minutes, then further dried in a furnace following the same heating profile (ramping from 120-250° C., then holding at 250° C. for 20 minutes). The film was then re-weighed for its final mass and the difference represented the gel fraction.

Comparative Example 1

For Comparative Example 1 (CE1) a polyimide solution in DMAc with a monomer composition of CBDA 0.6/6FDA 0.4//TFMB 1.0 was used for film fabrication. For CE1, 50 g of the 9.6 wt % polymer solution was de-gassed using a centrifugal-planetary mixer (THINKY USA, Laguna Hills, CA) to force the gas from the polymer at 2000 rpm for 10 minutes.

The solution was cast onto a glass substrate at 25° C. to produce 1-2 mil cured films. The film on the glass substrate was heated to 80° C. for 10 minutes and was subsequently lifted off the glass surface and mounted onto an 8×12 inch pin frame. The mounted film was placed in a furnace. The furnace was heated from 120 to 250° C. (16° C./min), then held at 250° C. for 20 minutes. The film was removed "hot" from the furnace after heating to 250° C. for 20 minutes and allowed to cool in air.

Example 1

For Example 1 (E1) a polyimide solution in DMAc with a monomer composition of CBDA 0.6/6FDA 0.4//TFMB 1.0 was used for film fabrication. For E1, 3.55 g of 10 wt % trans-N-boc-1,4-cyclohexanediamine (boc-CHDA) in DMAc was added to 50 g of the 9.6 wt % polymer solution and was mixed using the centrifugal-planetary mixer at 2200 rpm for 2 minutes. The solution was then de-gassed using the centrifugal-planetary mixer to force the gas from the polymer at 2000 rpm for 10 minutes.

The solution was cast onto a glass substrate at 25° C. to produce 1-2 mil films as described above for CE1.

Example 2

For Example 2 (E2) a polyimide solution in DMAc with a monomer composition of CBDA 0.6/6FDA 0.4//TFMB 1.0 was used for film fabrication. For E2, 7.1 g of 20 wt % boc-CHDA in DMAc was added to 50 g of the 9.6 wt % polymer solution and was mixed using the centrifugal-planetary mixer at 2200 rpm for 2 minutes. The solution was then de-gassed using the centrifugal-planetary mixer to force the gas from the polymer at 2000 rpm for 10 minutes.

The solution was cast onto a glass substrate at 25° C. to produce 1-2 mil films as described above for CE1.

Example 3

For Example 3 (E3) a polyimide solution in DMAc with a monomer composition of CBDA 0.6/6FDA 0.4//TFMB 1.0 was used for film fabrication and initially de-gassed using the centrifugal-planetary mixer to force the gas from the polymer at 2000 rpm for 10 minutes. For E3, 1.89 g of a solution containing 10 wt % 1,4-cyclohexanediamine (CHDA), 4.5 wt % acetic acid and 85.5 wt % DMAc was added to 50 g of the 9.6 wt % polymer solution and was mixed using the centrifugal-planetary mixer at 2200 rpm for 30 seconds.

The solution was cast onto a glass substrate at 25° C. to produce 1-2 mil films as described above for CE1.

Comparative Example 2

For Comparative Example 2 (CE2) a polyimide solution in DMAc with a monomer composition of CBDA 0.6/6FDA 0.4//TFMB 1.0 was used for film fabrication and initially de-gassed using the centrifugal-planetary mixer to force the gas from the polymer at 2000 rpm for 10 minutes. For CE2, 1.89 g of a solution containing 10 wt % CHDA, 6.6 wt % hydrochloric acid and 83.4 wt % DMAc was added to 50 g of the 9.6 wt % polymer solution and was mixed using the centrifugal-planetary mixer at 2200 rpm for 30 seconds.

The solution was cast onto a glass substrate at 25° C. to produce 1-2 mil films as described above for CE1.

Example 4

For Example 4 (E4), a soluble thermoplastic polyimide (Matrimid® 9725, Huntsman Corp., The Woodlands, TX), with a monomer composition of 3,3',4,4'-benzophenone tetracarboxylic dianhydride//3-(4-aminophenyl)-1,1,3-trimethyl-5-indanamine (BTDA 1.0//PIDA 1.0), was used as a dry powder.

For E4, 2.5 g of the dried polymer resin was added to 9.73 g of DMAc and mixed in the centrifugal-planetary mixer to obtain a solution. The solution was de-gassed using the centrifugal-planetary mixer to force the gas from the polymer at 2000 rpm for 10 minutes. 0.52 g of a solution containing 9.75 wt % HMD and 7.60 wt % of acetic acid in DMAc were added to the polyimide solution. The solution was mixed using the centrifugal-planetary mixer at 2200 rpm for 30 seconds.

The solution was cast onto a glass substrate at 25° C. to produce 1-2 mil cured films. The film on the glass substrate was heated to 90° C. for 25 minutes and was subsequently lifted off the glass surface and mounted onto an 8×12 inch pin frame. The mounted film was placed in a furnace and heated following the heating profile as described above for CE1.

Example 5

For Example 5 (E5), a soluble thermoplastic polyimide (Ultem™ 1000, GE Plastics, Boston, MA), with a monomer composition of 4,4'-bisphenol A dianhydride//p-phenylenediamine (BPADA 1.0//PPD 1.0), was used as a dry powder.

For E5, 2.5 g of the dried polymer resin was added to 9.51 g of DMAc and mixed in the centrifugal-planetary mixer to obtain a solution. The solution was de-gassed using the centrifugal-planetary mixer to force the gas from the polymer at 2000 rpm for 10 minutes. 0.49 g of a solution containing 9.75 wt % HMD and 7.60 wt % of acetic acid in DMAc were added to the polyimide solution. The solution was mixed using the centrifugal-planetary mixer at 2200 rpm for 30 seconds.

The solution was cast onto a glass substrate at 25° C. to produce 1-2 mil films as described above for E4.

Example 6

For Example 6 (E6), a soluble polyimide with a monomer composition of 6FDA 1.0//TFMB 0.75/HMD 0.25, was used as a dry powder. The TFMB and HMD was dissolved in DMAc and heated to 40° C. The 6FDA was then added and reacted overnight at 40° C. To obtain a substantially imidized solution, 4.0 molar equivalence of beta-picoline and 4.0 molar equivalence of acetic anhydride were added to the poly(amic acid) solution. That mixture was then stirred for 18 hours at 45° C. after which it was cooled to room temperature, then precipitated and washed with methanol. The resulting polyimide powder was dried under vacuum at 50° C. until constant weight.

For E6, 2.5 g of the dried polymer resin was added to 9.57 g of DMAc and mixed in the centrifugal-planetary mixer to obtain a solution. The solution was de-gassed using the centrifugal-planetary mixer to force the gas from the polymer at 2000 rpm for 10 minutes. 0.43 g of a solution containing 9.75 wt % HMD and 7.60 wt % of acetic acid in DMAc were added to the polyimide solution. The solution was mixed using the centrifugal-planetary mixer at 2200 rpm for 30 seconds.

The solution was cast onto a glass substrate at 25° C. to produce 1-2 mil films as described above for E4.

Table 1 summarizes Examples 1 to 6 and Comparative Examples 1 and 2.

TABLE 1

| Example | Polymer | Passivation Tactic | Crosslinker (mol %) | Gel Fraction (%) |
|---|---|---|---|---|
| CE1 | CBDA 0.6/6FDA 0.4//TFMB 1.0 | None | 0 | 0 |
| E1 | CBDA 0.6/6FDA 0.4//TFMB 1.0 | Boc Protecting Group | 20 | 97 |
| E2 | CBDA 0.6/6FDA 0.4//TFMB 1.0 | Boc Protecting Group | 80 | 100 |
| E3 | CBDA 0.6/6FDA 0.4//TFMB 1.0 | Acetic Acid | 20 | 81 |
| CE2 | CBDA 0.6/6FDA 0.4//TFMB 1.0 | Hydrochloric Acid | 20 | 0 |
| E4 | BTDA 1.0//PIDA 1.0 | Acetic Acid | 9.64 | 93 |
| E5 | BPADA 1.0//PPD 1.0 | Acetic Acid | 9.75 | 67 |
| E6 | 6FDA 1.0//TFMB 0.75/HMD 0.25 | Acetic Acid | 9.78 | 100 |

Example 7

For Example 7 (E7), to prepare a polymer with a composition of 6FDA 0.2/BPDA 0.3/TCP 0.5//TFMB 1.0, into a 1-L nitrogen purged resin kettle, 32.0213 g of TFMB was added along with 384.5 g of DMAc. 8.8932 g of biphenyl tetracarboxylic acid dianhydride (BPDA) and 8.8953 g of 6FDA were added. 10.1510 g of terephthaloyl chloride (TCP, Sigma Aldrich) was added in ⅓ portions to form the final solution.

396.96 g of the polyamide-amic acid solution was used with an additional 200 ml of DMAc added to the solution.

The reaction was heated to 40° C. with stirring. 26.85 g of acetic anhydride and 24.49 g of beta picoline were combined and then slowly added to the polyamide-amic acid solution over 30 minutes using a dropping funnel. The reaction mixture was heated to 80° C. and then stirred for 2 hours before allowing to cool to room temperature for 12 hours.

The reaction mixture was poured into excess water to precipitate the resin and pulverized in a blender before collection by filtration. The precipitated solid was washed copiously with methanol. The polymer was dried under vacuum at 25° C. for ~16 hour to form the final resin.

3.50 g of the resin was dissolved in 31.45 g of DMAc along with 0.166 g of N-Boc-1,6-hexanediamine. The mixture was agitated using the centrifugal-planetary mixer for two cycles of eight minutes. The material was filtered through 10 μm filter media, remixed and re-filtered to prepare the final formulation.

The solution was cast onto a glass substrate at 25° C. to produce ~2 mil films. The coating solution of composition was cast on a glass substrate at 25° C. using a doctor blade with a 40 mm clearance to produce ~2 mil film after curing. The film on the glass substrate was heated to 50° C. for 30 min then to 90° C. for 30 min on a hotplate. The film was allowed to cool to room temperature. The coating was placed onto a hotplate and heated to 50° C. for 30 min then to 80° C. for 30 min in air. The film was released using a razor and mounted onto a 4×8 inch pin frame and placed in a furnace (Carbolite Gero, Sheffield, UK). The furnace was then purged with nitrogen and heated according to the following temperature protocol:

25 to 90° C. (7° C./min), hold at 45° C. for 5 minutes;
90 to 150° C. (7° C./min), hold at 150° C. for 10 minutes;
150 to 250° C. (7° C./min), hold at 250° C. for 20 minutes;

The film was removed from the furnace after heating to 250° C. for 20 minutes and allowed to cool in air.

The gel fraction of the film was 95.5 wt %. A substantial amount of film was not dissolved after soaking in DMAc for five days.

Comparative Example 3

For Comparative Example 3 (CE3), the procedure of E7 was used, except that the N-Boc-1,6-hexanediamine was not added to the coating formulation. This polymer was soluble in DMAc (gel fraction=0%).

Table 2 summarizes Example 7 and Comparative Example 3.

TABLE 2

| Example | Polymer | Passivation Tactic | Crosslinker (mol %) | Gel Fraction (%) |
|---|---|---|---|---|
| E7 | 6FDA 0.2/BPDA 0.3/TCP 0.5//TFMB 1.0 | Boc Protecting Group | 10 | 95.5 |
| CE3 | 6FDA 0.2/BPDA 0.3/TCP 0.5//TFMB 1.0 | None | 0 | 0 |

Note that not all of the activities described above in the general description are required, that a portion of a specific activity may not be required, and that further activities may be performed in addition to those described. Still further, the order in which each of the activities are listed are not necessarily the order in which they are performed. After reading this specification, skilled artisans will be capable of determining what activities can be used for their specific needs or desires.

In the foregoing specification, the invention has been described with reference to specific embodiments. However, one of ordinary skill in the art appreciates that various modifications and changes can be made without departing from the scope of the invention as set forth in the claims below. All features disclosed in this specification may be replaced by alternative features serving the same, equivalent or similar purpose. Accordingly, the specification is to be regarded in an illustrative rather than a restrictive sense and all such modifications are intended to be included within the scope of the invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:
1. A coating solution comprising:
    a soluble polymer comprising an imide group; and
    a crosslinking precursor comprising:
        a first amine group that is either reactive or passivated towards crosslinking; and one or more additional amine groups, wherein the one or more additional amine groups has been passivated towards crosslinking by forming a moiety selected from the group consisting of carbamates, N-aryl amines, N,N-diaryl amines, benzyl amines, amides, sulfonamides, ammonium salts made from acids and silyl derivatives, such that the crosslinking precursor is un-reactive towards the soluble polymer having an imide group upon initial introduction and after activation, the crosslinking precursor can be chemically converted, thermally converted, photo-converted or dissociated to form at least two reactive amines.

2. The coating solution of claim 1, wherein a carbamate is thermally cleavable.

3. The coating solution of claim 2, wherein the thermally cleavable carbamate comprises a passivating group selected from the group consisting of tert-butyloxycarbonyl, fluorenylmethoxycarbonyl, and benzyl carbamate.

4. The coating solution of claim 1, wherein a carbamate is photo-cleavable and a photo-cleavable carbamate is selected from the group consisting of 3,5-dimethoxybenzyl carbamate, m-nitrophenyl carbamate, and o-nitrobenzyl carbamate.

5. The coating solution of claim 1, wherein an amide is selected from the group consisting of formamide, trifluoroacetamide, trichloroacetamide, chloroacetamide, phenylacetamide, 3-phenylpropanamide, 3-pyridylcarboxamide, N-benzoylphenylalanyl, and benzamide.

6. The coating solution of claim 1, wherein an amide can be thermally cleaved, chemically cleaved, photo-cleaved, dissociated or a mixture thereof.

7. The coating solution of claim 1, wherein:
an ammonium salt is made from an acid selected from the group consisting of acetic acid, butyric acid, pivalic acid, hydrochloric acid, and sulfuric acid; and
the ammonium salt can be thermally dissociated to form a reactive amine.

8. The coating solution of claim 1, wherein the crosslinking precursor is selected from a single multi-functional precursor, a combination of multiple single-functional precursors, or a mixture thereof.

9. The coating solution of claim 1, wherein the soluble polymer is selected from the group consisting of polyimides, poly(amide-imides), poly(ether-imides), poly(ester-imides), copolymers comprising amide, ester or ether groups, and mixtures thereof.

10. The coating solution of claim 1, further comprising a filler selected from the group consisting of nanoparticles, colorants, matting agents, submicron particles, thermally conductive fillers, electrically conductive fillers and mixtures thereof.

11. The coating solution of claim 10, wherein a colorant comprises low conductivity carbon black.

* * * * *